United States Patent Office 3,130,221
Patented Apr. 21, 1964

3,130,221
1,1-DIHYDROPERFLUOROETHYL-
SULFONIC ACID
Robert E. Oesterling, Flourtown, Pa., assignor to Pennsalt Chemicals Corporation, Philadelphia, Pa., a corporation of Pennsylvania
No Drawing. Filed Feb. 10, 1961, Ser. No. 88,579
1 Claim. (Cl. 260—513)

This invention relates to novel fluoroalkyl sulfur compounds and their preparation, which compounds have the structure $R_f$—$CH_2$—$SO_3H$, where $R_f$ is a lower perfluoroalkyl group. This invention is a continuation-in-part of my application Serial No. 841,949, filed September 24, 1959 and now U.S. 3,006,964.

The compounds of this invention are named as 1,1-dihydroperfluoroalkyl sulfonic acids, and they are made by hydrolysis of 1,1-dihydroperfluoroalkyl sulfonyl chlorides. The sulfonyl chloride is obtained readily by chlorination of bis(1,1-dihydroperfluoroalkyl)disulfides (i.e., $R_fCH_2$—S—S—$CH_2$—$R_f$), which disulfides may be obtained by reaction of a 1,1-dihydroperfluoroalkyl p-toluenesulfonate and sodium sulfide as described in U.S. 2,894,991, or, preferably, as described in my application S.N. 841,949 referred to above.

The novel compounds of this invention are strong acids and are of use where strong acids are employed; e.g., base neutralization, alkylation catalysis, metal cleaning, etc. In addition, these novel compounds are of particular value because of their relatively high thermal stability. It is known that trifluoromethanesulfonic acid (e.g., $CF_3SO_3H$) is useful as a component in certain unique, thermally stable liquid rocket propellants. In considering compounds having high temperature stability, however, the presence of carbon-hydrogen bonds (as well as carbon-carbon bonds) would be expected to greatly lower thermal stability. Surprisingly, however, it has now been found that the 1,1-dihydroperfluoroalkylsulfonic acids of this invention, although containing both carbon-carbon and carbon-hydrogen bonds, have excellent thermal stability and are useful as high energy fuels. Furthermore, the compounds of this invention have increased energy content over perfluoromethanesulfonic acid and other perfluoroalkyl sulfonic acids and render a higher specific impulse in propellant formulations in which they are used. Thus, this invention provides a significant advance in the art of high energy fuel systems.

As indicated, to make the 1,1-dihydroperfluoroalkyl-sulfonic acids, a bis(1,1-dihydroperfluoroalkyl)disulfide is suspended in an aqueous system and gaseous chlorine passed through the suspension at a temperature of about 30° C. to about 80° C. until chlorine is no longer absorbed. Temperatures below about 30° C. are not practical because the chlorination proceeds too slowly. On the other hand, temperatures of chlorination above about 80° C. are not preferred, because hydrolysis will occur and a less pure product will be obtained. When the chlorination reaction is completed, as indicated by no further absorption of chlorine, the reaction mass is allowed to settle and the layer heavier than the water is separated, dried (conveniently with an anhydrous hydrate-forming salt; e.g. $MgSO_4$) and then the liquid is vacuum distilled to obtain the pure sulfonyl chloride. The 1,1-dihydroperfluoroalkyl sulfonyl chlorides are dense, colorless liquids and have the typical acrid odor of HCl on exposure to air. The sulfonyl chloride is then hydrolyzed to the sulfonic acid by heating at about 80° to 100° C. in an aqueous system with or without base being present. A base may be employed if it is desired to obtain the sulfonic acid salt, but if the free acid is desired, it is preferred to avoid the use of alkali. The hydrolysis proceeds rapidly and requires, at most, only a few hours for completion.

The 1,1-dihydroperfluoroalkylsulfonic acids are strong acids which are water soluble and are separated from the reaction mixture simply by removal of water, leaving a solid residue. For purification, subsequent vacuum distillation of the solid residue may be made. In this way, a colorless, crystalline, hygroscopic solid is obtained, which is characteristic of the 1,1-dihydroperfluoroalkylsulfonic acids of this invention. The hydrolysis may be carried out without isolation of the sulfonyl chloride, but it is preferred to hydrolyze the isolated sulfonyl chloride in order to obtain a purer sulfonic acid product.

The compounds of this invention include the 1,1-dihydroperfluoroalkylsulfonic acids containing from two to five carbon atoms; i.e. from one to four carbon atoms in the $R_f$ (perfluoroalkyl) portion of the molecule. The contemplated compounds include 1,1-dihydroperfluoroethylsulfonic acid, 1,1 - dihydroperfluoropropylsulfonic acid, the 1,1-dihydroperfluorobutylsulfonic acids and the 1,1-dihydroperfluoroamylsulfonic acids. Of this group the preferred compound for use as a high energy fuel is 1,1-dihydroperfluoroethylsulfonic acid. As the number of carbon atoms in the molecule increases, the thermal stability decreases and compounds containing above five carbon atoms are of little value as a fuel.

It will be understood that these novel compounds may be used in the various systems employing high energy fuels. Thus they may be used in jet fuels, rocket fuels, monopropellants, bipropellants and the like. In order to exemplify the invention further, the following examples are given.

EXAMPLE 1

Chlorine gas was passed through a stirred mixture of bis(trifluoroethyl)disulfide (30 g.) in 75 ml. of water at 60°–70° C. for two hours, after which time chlorine was no longer absorbed. After standing, the layer heavier than water was separated and dried over anhydrous magnesium sulfate. Vacuum distillation gave 32.5 g. (70% yield) of the colorless liquid, 1,1-dihydroperfluoroethylsulfonyl chloride, B.P. 65° C. (45 mm.); $n_D^{23}$ 1.3873.

Analysis.—Calcd. for $C_2H_2ClF_3O_2S$: C, 13.16; H, 1.11; Cl, 19.40; S, 17.57. Found: C, 13.40; H, 1.12; Cl, 20.02; S, 17.27.

Hydrolysis of 20 g. of the sulfonyl chloride by refluxing with 50 ml. of water for three hours gave a quantitative yield (18 g.) of 1,1-dihydroperfluoroethylsulfonic acid after removal of the water under vacuum. Vacuum distillation of the acid gave the colorless, hygroscopic solid ($CF_3CH_2SO_3H$); B.P. 100° C. (0.5 mm.); M.P. 50–52° C.

EXAMPLE 2

A monopropellant was prepared by adding with agitation 38.42 parts of perchloric acid dihydrate to 61.58 parts of 1,1-dihydroperfluoroethylsulfonic acid. The resulting solution was a clear, water-like liquid. The amounts of fuel and oxidizer are stoichiometric quantities for complete combustion. The specific impulse for this monopropellant is 125 seconds as calculated for a frozen equilibrium at a pressure ratio of $P_c/P_e=300/14.7$ where $P_c$ is chamber pressure and $P_e$ is exit pressure. If trifluoromethanesulfonic acid is used in the above formulation instead of the 1,1-dihydroperfluoroethylsulfonic acid the specific impulse for the monopropellant is only 70 seconds.

The above monopropellant containing the 1,1-dihydroperfluoroethylsulfonic acid fuel was evaluated for thermal stability and compatibility with metals:

Thermal Stability

A weighed sample of the monopropellant was heated to 249° C. and held at this temperature for eight hours. After cooling, the sample was reweighed and the percent of weight loss determined. It was found that the weight loss was only 3.4 percent by weight. This weight loss is indicative of only minor decomposition and the monopropellant is considered to have adequate thermal stability for use at the test temperature. Other monopropellants (e.g. dimethyltriethylenediammonium dinitrate in nitric acid) have a maximum permissible exposure below 121° C. and thus cannot be used in higher temperature systems.

*Compatibility*

The monopropellant did not attack copper or aluminum and may thus be contained in and transported through equipment of these materials.

EXAMPLE 3

A monopropellant prepared in accordance with Example 2, but using 1,1-dihydroperfluoro-n-butylsulfonic acid (e.g. $C_3F_7CH_2SO_3H$) instead of the 1,1-dihydroperfluoroethylsulfonic acid has a specific impulse of 142 seconds (frozen equilibrium).

It will be understood that many changes may be made from the above description without departing from the spirit and scope of the invention.

I claim:
1. 1,1-dihydroperfluoroethylsulfonic acid.

References Cited in the file of this patent
UNITED STATES PATENTS

| | | |
|---|---|---|
| 2,277,326 | Hueter et al. | Mar. 24, 1942 |
| 2,732,398 | Brice et al. | Jan. 24, 1956 |
| 2,961,470 | Sheppard | Nov. 22, 1960 |

OTHER REFERENCES

Houben-Weyl: Methoden der Organischen Chemie, vol. 9, 1955, pages 392, 393, 403.